UNITED STATES PATENT OFFICE.

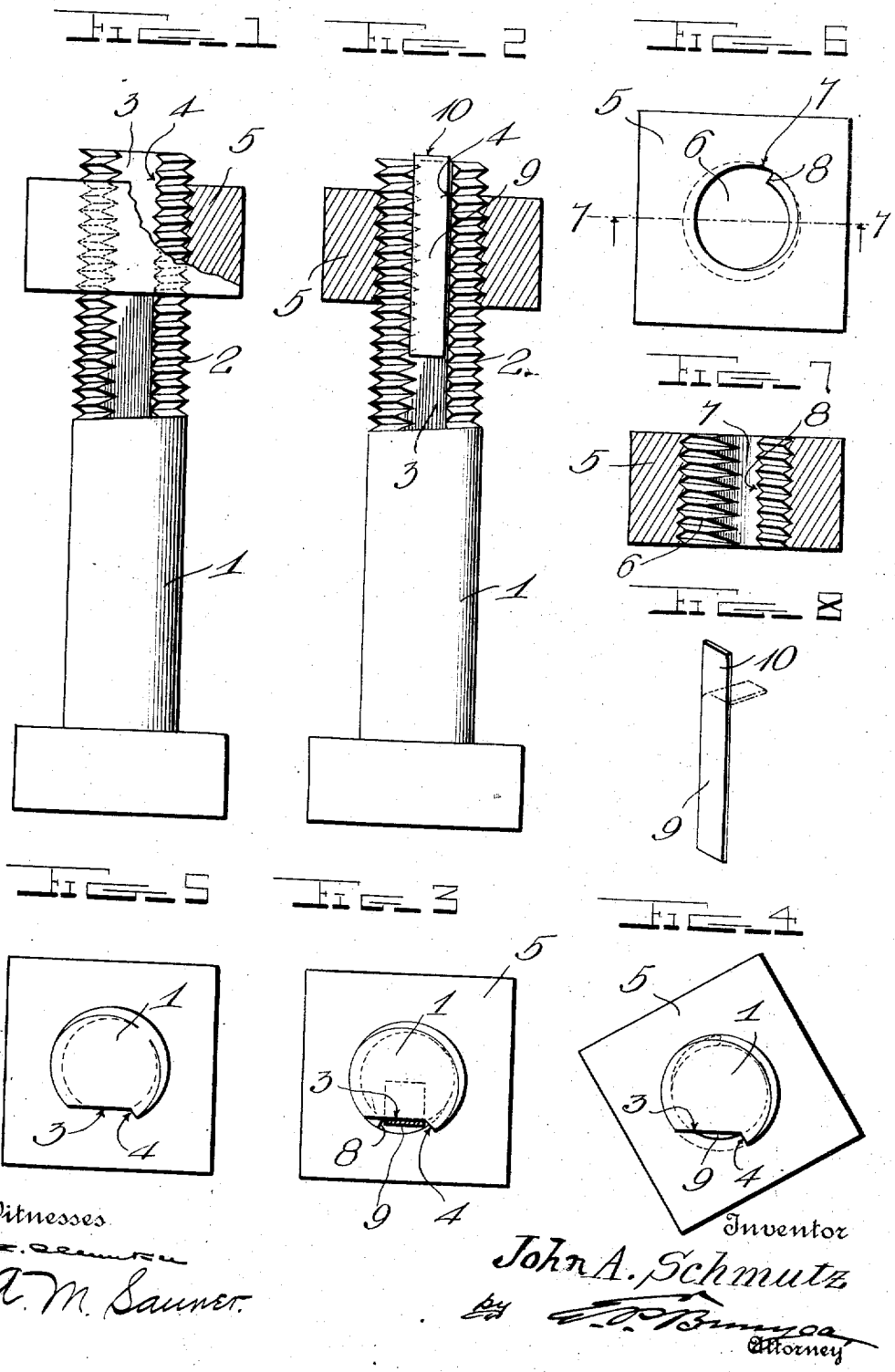

JOHN A. SCHMUTZ, OF CUMBERLAND, MARYLAND.

NUT-LOCK.

977,479.  Specification of Letters Patent.  Patented Dec. 6, 1910.

Application filed April 18, 1910.  Serial No. 556,257.

*To all whom it may concern:*

Be it known that I, JOHN A. SCHMUTZ, a citizen of the United States, residing at Cumberland, in the county of Allegany and State of Maryland, have invented certain new and useful Improvements in Nut-Locks, of which the following is a specification.

This invention relates to nut locks and one of the principal objects of the same is to provide reliable and efficient means for locking a nut upon a bolt at any point within the range of its adjustment, said means permitting the readjustment of the nut at any time.

Another object of the invention is to provide a simple nut lock which will reliably hold the nut to a bolt and prevent its accidental release in use, said nut lock comprising a malleable metal key adapted to fit against a shoulder formed upon a plain portion of a bolt. These and other objects may be attained by means of the construction illustrated in the accompanying drawing, in which, Figure 1 is a side elevation of a bolt and nut, said bolt being provided with a plain portion extending across the threaded part of the nut, the latter being broken away at one side. Fig. 2 is a side elevation of the bolt showing the locking key in place and the nut in section. Fig. 3 is an end view of the bolt showing the nut in plane and a locking key in section. Fig. 4 is a similar view showing the position of the nut after it has been adjusted on the bolt. Fig. 5 is an end view of the bolt and nut showing the plane surface and shoulder on the bolt. Fig. 6 is a plan view of the nut. Fig. 7 is a transverse sectional view on the line 7—7 of Fig. 6 looking in the direction indicated by the arrows. Fig. 8 is a perspective view of the malleable metal key showing in dotted lines the downwardly bent end of said key.

Referring to the drawing the numeral 1 designates a bolt having a threaded end 2. Extending from one end of the threaded portion 2 is a plain unthreaded surface 3 having an inclined shoulder 4 at one side thereof. The nut 5 is provided with a bolt hole 6 extending through the same, said bolt hole being provided with a plain unthreaded surface 7 forming a cam face, said unthreaded surface having a shoulder 8 at one side thereof. A key 9, preferably formed of a strip of copper or similar ductile or malleable metal is adapted to be pushed into the space formed by the plane surface 3 on the bolt and the plain surface 7 in the nut after the nut has been adjusted on the bolt.

A slight turn of the nut after the key has been placed into position will press the key into the threads and prevent the nut from moving off the bolt in use. The unthreaded cam surface 7 of the nut will crowd the key into the threads when the nut is turned. After the nut has been adjusted the end 10 of the key may be bent downward against the end of the bolt or cut off close to the face of the nut.

My invention is simple in form, reliable and efficient in use, can be quickly applied, can be manufactured at low cost and will hold a nut reliably upon a bolt and permit readjustment of the nut at any time required.

Having thus fully described the invention what is claimed as new is:

A nut lock comprising a bolt having a plane surface extending longitudinal of the threaded portion thereof, said surface having a shoulder at one side thereof, a nut having a plane unthreaded surface extending across the threaded hole to form a cam face, said surface having a shoulder at one side thereof disposed in opposition to the shoulder on the plane surface of the bolt, and a malleable metal key for engaging the unthreaded portions of the bolt and nut to prevent accidental release of the nut when turned upon the bolt.

In testimony whereof I affix my signature in presence of two witnesses.

JOHN A. SCHMUTZ.

Witnesses:
 A. F. GETTY,
 L. W. NAVE.